United States Patent [19]

Behrens et al.

[11] Patent Number: 4,691,015

[45] Date of Patent: Sep. 1, 1987

[54] HYDROXYLAMINES DERIVED FROM HINDERED AMINES

[75] Inventors: Rudolf A. Behrens, New Fairfield, Conn.; Raymond Seltzer, New City, N.Y.

[73] Assignee: Ciba-Geigy Corporation, Ardsley, N.Y.

[21] Appl. No.: 714,651

[22] Filed: Mar. 21, 1985

Related U.S. Application Data

[63] Continuation-in-part of Ser. No. 633,549, Jul. 23, 1984, Pat. No. 4,590,231, which is a continuation-in-part of Ser. No. 540,732, Oct. 11, 1983, abandoned.

[51] Int. Cl.$^4$ .................. C07D 413/04; C07D 401/14; C07D 401/02; C07D 295/00; C07D 211/94
[52] U.S. Cl. ........................ 544/198; 524/95; 524/99; 524/102; 524/103; 524/351; 544/383; 544/384; 546/19; 546/20; 546/186; 546/188; 546/189; 546/245
[58] Field of Search ............ 524/95, 99, 102, 103; 544/198, 383, 351, 384; 546/19, 20, 186, 188, 189, 245

[56] References Cited

U.S. PATENT DOCUMENTS

| | | | |
|---|---|---|---|
| 3,640,928 | 2/1972 | Murayama et al. | 524/99 |
| 3,644,278 | 2/1972 | Klemchuk . | |
| 3,853,890 | 10/1974 | Holt . | |
| 3,936,456 | 2/1976 | Ramey et al. | 544/383 |
| 3,941,744 | 3/1976 | Murayama et al. | 546/19 |
| 3,994,857 | 11/1976 | Holt . | |
| 4,055,536 | 10/1977 | Soma et al. | 546/189 |
| 4,064,102 | 12/1977 | Hillard et al. | 546/189 |
| 4,102,858 | 7/1978 | Minagawa et al. | 524/103 |
| 4,104,248 | 8/1978 | Cantatore | 524/103 |
| 4,108,829 | 8/1978 | Cassandrini et al. | 544/198 |
| 4,198,334 | 4/1980 | Rasberger | 524/99 |
| 4,239,891 | 12/1980 | Wiezer et al. | 524/103 |
| 4,292,240 | 9/1981 | Lai et al. | 544/384 |
| 4,369,274 | 1/1983 | Thomas . | |
| 4,396,735 | 8/1983 | Minagawa et al. | 524/102 |
| 4,404,302 | 9/1983 | Gupta et al. | 524/86 |
| 4,472,547 | 9/1984 | Malherbe | 524/98 |

FOREIGN PATENT DOCUMENTS

| | | |
|---|---|---|
| 54-69162 | 6/1979 | Japan . |
| 577011 | 6/1976 | Switzerland . |
| 1316341 | 5/1973 | United Kingdom . |

OTHER PUBLICATIONS

D. M. Wiles, "Kinetics of UV Stabilization in Polymers", presented Jun. 23–27, 1980, at the Symposium on Polymer Stabilization at New Paltz, N.Y., at the New York State University.

*Primary Examiner*—Veronica P. Hoke
*Attorney, Agent, or Firm*—Luther A. R. Hall; Luther A. R. Hall

[57] ABSTRACT

Hydroxylamines derived from hindered amines are effective in stabilizing polyolefin compositions containing a stabilizer or mixture of stabilizers selected from the group consisting of the phenolic antioxidants, the hindered amine light stabilizers, the alkylated hydroxybenzoate light stabilizers, the ultraviolet light absorbers, the organic phosphorus compounds, the alkaline metal salts of fatty acids and the thiosynergists, against degradation upon high temperature extrusion, exposure to the combustion products of natural gas, gamma irradiation or upon storage for extended periods.

9 Claims, No Drawings

HYDROXYLAMINES DERIVED FROM HINDERED AMINES

This is a continuation-in-part of application Ser. No. 633,549, filed July 23, 1984, now U.S. Pat. No. 4,590,231 which in turn is a continuation-in-part of application Ser. No. 540,732, filed Oct. 11, 1983, now abandoned.

BACKGROUND OF THE INVENTION

The present invention pertains to polyolefin compositions containing a stabilizer or mixture of stabilizers selected from the group consisting of the phenolic antioxidants, the hindered amine light stabilizers, the alkylated hydroxybenzoate light stabilizers, the ultraviolet light absorbers, the organic phosphorus compounds, the alkaline metal salts of fatty acids and the thiosynergists, which are stabilized against degradation and/or discoloration by an effective amount of a selected hydroxylamine derivative.

The instant hydroxylamine compounds are derived from hindered amine light stabilizers. The hindered amines are generally known compounds and many enjoy commercial utility as light stabilizers.

Some hydroxylamine compounds derived from hindered amines are known. Di-(1-hydroxy-2,2,6,6,-tetramethylpiperidin-4-yl) sebacate is described by E. F. Litvin et al., Chemical Abstracts 74, 64180u (1971).

Other N-hydroxy derivatives of hindered amines are described in U.S. Pat. Nos. 3,936,456, 4,404,302 and 4,472,547.

OBJECT OF THE INVENTION

The object of the instant invention is to provide new hydroxylamine compounds derived from hindered amines.

These new hydroxylamines are effective in stabilizing polyolefins from discoloration when the polyolefin contains one or more other stabilizers selected from the group consisting of the phenolic antioxidants, the hindered amine light stabilizers, the alkylated hydroxybenzoate light stabilizers, the ultraviolet light absorbers, the organic phosphorous compounds, the alkaline metal salts of fatty acids and the thiosynergists.

DETAILED DISCLOSURES

This invention also pertains to a composition, stabilized against degradation, which comprises (a) a saturated polyolefin or mixture thereof, (b) a stabilizing amount of a stabilizer or mixture of stabilizers selected from the group consisting of the phenolic antioxidants, the hindered amine light stabilizers, the alkylated hydroxybenzoate light stabilizers, the ultraviolet light absorbers, the organic phosphorus compounds, the alkaline metal salts of fatty acids and the thiosynergists, and (c) a stabilizing amount of a hydroxylamine derivative, or a mixture thereof, containing the group

The instant composition is stabilized against degradation and/or discoloration upon exposure to heating at elevated temperatures, to the combustion products of natural gas, to gamma irradiation or to prolonged storage at ambient temperature.

More particularly, the instant invention relates to a a hydroxylamine derivative having one of formula A to M

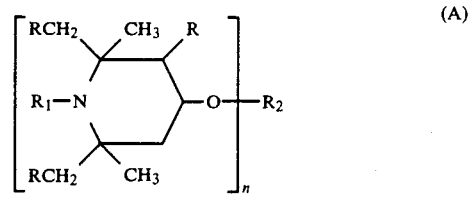

(A)

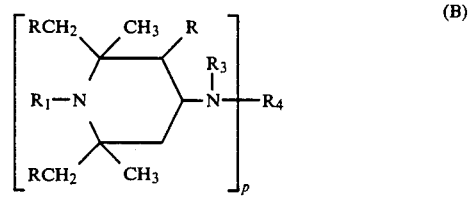

(B)

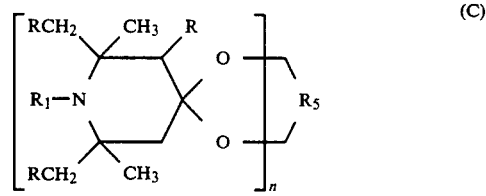

(C)

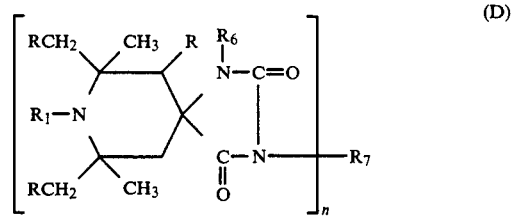

(D)

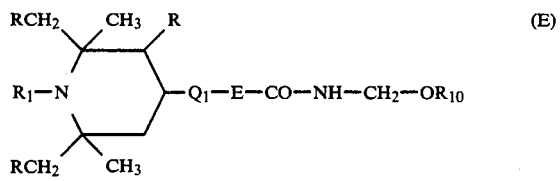

(E)

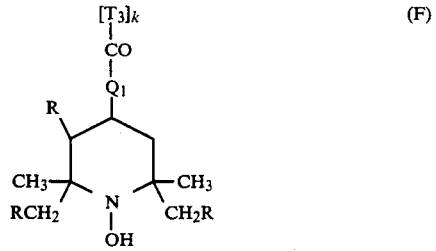

(F)

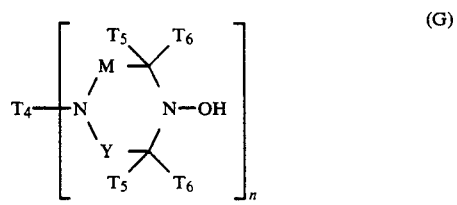

(G)

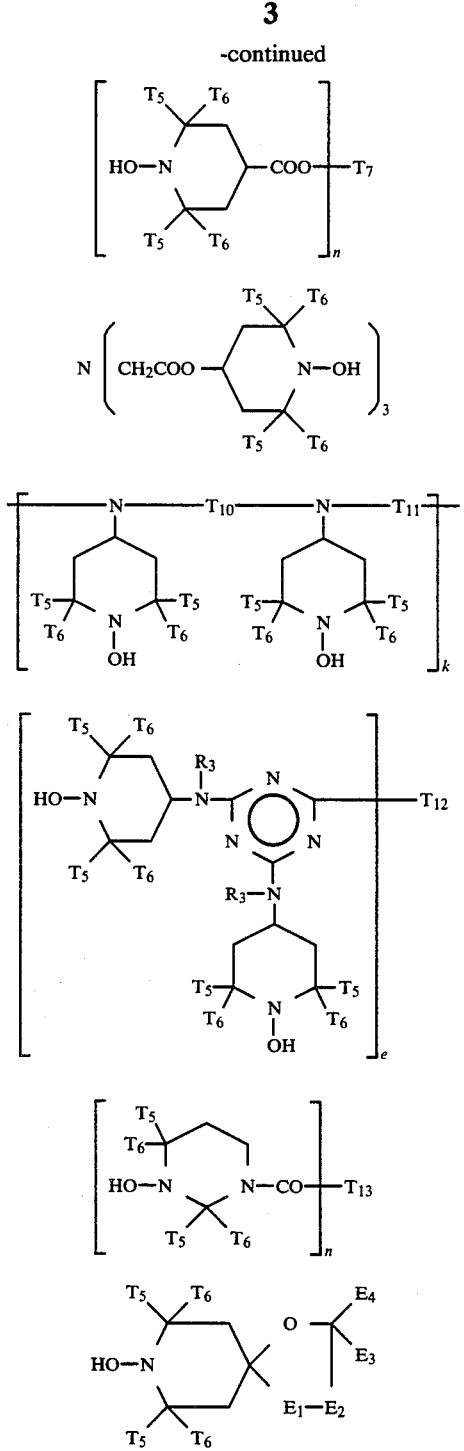

(H)

(I)

(J)

(K)

(L), or (M)

wherein
R is hydrogen or methyl,
n is 1 or 2,
$R_1$ is hydroxyl,
when n is 1,
$R_2$ is hydrogen, $C_1-C_{18}$ alkyl optionally interrupted by one or more oxygen atoms, cyanoethyl, benzyl, glycidyl, a monovalent acyl radical of an aliphatic, cycloaliphatic, araliphatic or aromatic carboxylic acid, or of carbamic acid or of a phosphorus-containing acid, or a monovalent silyl radical, preferably an acyl radical of an aliphatic carboxylic acid having 2–18 C atoms, of a cycloaliphatic carboxylic acid having 5–12 C atoms or of an aromatic carboxylic acid having 7–15 C atoms, or
when n is 2,
$R_2$ is $C_1-C_{12}$ alkylene, $C_4-C_{12}$ alkenylene, xylylene, a divalent acyl radical of an aliphatic, cycloaliphatic, araliphatic or aromatic dicarboxylic acid, of a dicarbamic acid or of a phosphorus-containing acid, or a bivalent silyl radical, preferably an acyl radical of an aliphatic dicarboxylic acid having 2–36 C atoms, of a cycloaliphatic or aromatic dicarboxylic acid having 8–14 C atoms, or of an aliphatic, cycloaliphatic or aromatic dicarbamic acid having 8–14 C atoms;
p is 1, 2 or 3,
$R_3$ is hydrogen, $C_1-C_{12}$ alkyl, $C_5-C_7$ cycloalkyl, $C_7-C_8$ aralkyl, $C_2-C_{18}$ alkanoyl, $C_3-C_5$ alkenoyl or benzoyl;
when p is 1,
$R_4$ is hydrogen, $C_1-C_{18}$ alkyl, $C_5-C_7$ cycloalkyl, $C_2-C_8$ alkenyl unsubstituted or substituted by a cyano, carbonyl or carbamide group, or it is glycidyl, a group of the formula $-CH_2-CH(OH)-Z$ or of the formula $-CONH-Z$ wherein Z is hydrogen, methyl or phenyl; or
when p is 2,
$R_4$ is $C_2-C_{12}$ alkylene, $C_6-C_{12}$ arylene, xylylene, a $-CH_2CH(OH)-CH_2$ group, or a group $-CH_2-CH(OH)-CH_2-O-X-O-CH_2-CH(OH)-CH_2-$ wherein X is $C_2-C_{10}$ alkylene, $C_6-C_{15}$ arylene or $C_6-C_{12}$ cycloalkylene; or, provided that $R_3$ is not alkanoyl, alkenoyl or benzoyl, $R_4$ can also be a divalent acyl radical of an aliphatic, cycloaliphatic or aromatic dicarboxylic acid or dicarbamic acid, or can be the group $-CO-$; or $R_3$ and $R_4$ together when p is 1 can be the cyclic acyl radical of an aliphatic or aromatic 1,2- or 1,3-dicarboxylic acid, or
$R_4$ is

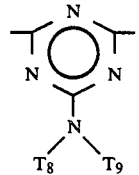

where $T_8$ and $T_9$ are independently hydrogen, alkyl of 1 to 18 carbon atoms, or $T_8$ and $T_9$ together are alkylene of 4 to 6 carbon atoms or 3-oxapentamethylene, preferably $T_8$ and $T_9$ together are 3-oxapentamethylene;
when p is 3,
$R_4$ is 2,4,6-triazinyl,
when n is 1,
$R_5$ is $C_2-C_8$ alkylene or hydroxyalkylene or $C_4-C_{22}$ acyloxyalkylene; or
when n is 2,
$R_5$ is $(-CH_2)_2C(CH_2-)_2$;
$R_6$ is hydrogen, $C_1-C_{12}$ alkyl, allyl, benzyl, glycidyl or $C_2-C_6$ alkoxyalkyl;
when n is 1
$R_7$ is hydrogen, $C_1-C_{12}$ alkyl, $C_3-C_5$ alkenyl, $C_7-C_9$ aralkyl, $C_5-C_7$ cycloalkyl, $C_2-C_4$ hydroxyalkyl, $C_2-C_6$ alkoxyalkyl, $C_6-C_{10}$ aryl, glycidyl, a group of the formula $-(CH_2)_m-COO-Q$ or of the formula $-(CH_2)_m-O-CO-Q$ wherein m is 1 or 2, and Q is $C_1-C_4$ alkyl or phenyl; or
when n is 2, $R_7$ is $C_2$-$C_{12}$ alkylene, $C_6$-$C_{12}$ arylene, a group —$CH_2CH(OH)$—$CH_2$—O—X—O—$CH_2$—$CH(OH)$—$CH_2$— wherein X is $C_2$-$C_{10}$ alkylene, $C_6$-$C_{15}$ arylene or $C_6$-$C_{12}$ cycloalkylene, or a group —$CH_2CH(OZ')CH_2$—$(OCH_2$—$CH(OZ')CH_2)_2$— wherein $Z'$ is hydrogen, $C_1$-$C_{18}$ alkyl, allyl, benzyl, $C_2$-$C_{12}$ alkanoyl or benzoyl;

$Q_1$ is —$N(R_8)$— or —O—; E is $C_1$-$C_3$ alkylene, the group —$CH_2$—$CH(R_9)$—O— wherein $R_9$ is hydrogen, methyl or phenyl, the group —$(CH_2)_3$—NH— or a direct bond;

$R_{10}$ is hydrogen or $C_1$-$C_{18}$ alkyl, $R_8$ is hydrogen, $C_1$-$C_{18}$ alkyl, $C_5$-$C_7$ cycloalkyl, $C_7$-$C_{12}$ aralkyl, cyanoethyl, $C_6$-$C_{10}$ aryl, the group —$CH_2$—$CH(R_9)$—OH wherein $R_9$ has the meaning defined above; a group of the formula

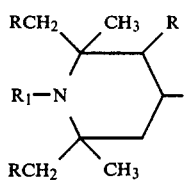

or a group of the formula

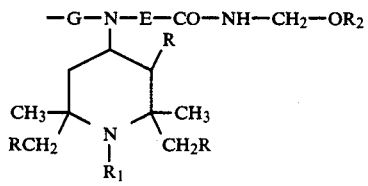

wherein G can be $C_2$-$C_6$ alkylene or $C_6$-$C_{12}$ arylene; or $R_8$ is a group —E—CO—NH—$CH_2$—$OR_{10}$;

Formula F denotes a recurring structural unit of a polymer where $T_3$ is ethylene or 1,2-propylene, or is the repeating structural unit derived from an alpha-olefin copolymer with an alkyl acrylate or methacrylate; preferably a copolymer of ethylene and ethyl acrylate, and where k is 2 to 100;

$T_4$ has the same meaning as $R_4$ when p is 1 or 2, $T_5$ is methyl, $T_6$ is methyl or ethyl, or $T_5$ and $T_6$ together are tetramethylene or pentamethylene or mixture of said hydroxyamine derivatives, preferably $T_5$ and $T_6$ are each methyl, M and Y are independently methylene or carbonyl, preferably m is methylene and Y is carbonyl, and $T_4$ is ethylene where n is 2;

$T_7$ is the same as $R_7$, and $T_7$ is preferably octamethylene where n is 2, $T_{10}$ and $T_{11}$ are independently alkylene of 2 to 12 carbon atoms, or $T_{11}$ is

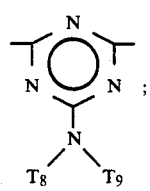

$T_{12}$ is

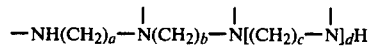

where a, b and c are independently 2 or 3, and d is 0 or 1, preferably a and c are each 3, b is 2 and d is 1; and e is 3 or 4, preferably 4;

$T_{13}$ is the same as $R_2$ with the proviso that $T_{13}$ cannot be hydrogen when n is 1;

$E_1$ and $E_2$, being different, each are oxo or imino, preferably $E_1$ is oxo and $E_2$ is imino, $E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms, and $E_4$ is hydrogen, alkyl of 1 to 30 carbon atoms, phenyl, naphthyl or phenylalkyl of 7 to 12 carbon atoms, or $E_3$ and $E_4$ together are polymethylene of 4 to 17 carbon atoms, or said polymethylene substituted by up to four alkyl groups of 1 to 4 carbon atoms, preferably methyl.

Of particular interest are the hydroxylamine derivatives of formula D, G–K or M.

The hydroxylamine derivatives of the instant invention are generally prepared by oxidizing a hindered amine with an appropriate peroxy compound such as hydrogen peroxide or tert-butyl hydroperoxide in the presence of a metal carbonyl catalyst followed by reduction of the oxyl intermediate formed to the desired hydroxylamine derivative, preferably by catalytic hydrogenation.

The hindered amine precursors are largely commercially available or are prepared by known methods.

In the structures A to M, if any substituents are $C_1$-$C_{12}$ alkyl, they are for example methyl, ethyl, n-propyl, n-butyl, sec-butyl, tert-butyl, n-hexyl, n-octyl, 2-ethylhexyl, n-nonyl, n-decyl, n-undecyl or n-dodecyl.

As $C_1$-$C_{18}$ alkyl, $R_2$ can be for example the groups given above, and in addition for example n-tridecyl, n-tetradecyl, n-hexadecyl or n-octadecyl.

If $R_2$ is a monovalent acyl radical of a carboxylic acid, it is for example an acyl radical of acetic acid, stearic acid, salicylic acid, methacrylic acid, maleic acid, benzoic acid or $\beta$-(3,5-di-tert-butyl-4-hydroxyphenyl)propionic acid.

If $R_2$ is a divalent acyl radical of a dicarboxylic acid, it is for example an acyl radical of adipic acid, suberic acid, sebacic acid, phthalic acid, dibutylmalonic acid, dibenzylmalonic acid orbutyl-(3,5-di-tert-butyl-4-hydroxybenzyl)-malonic acid, or bicycloheptenedicarboxylic acid.

If $R_2$ is a divalent acyl radical of a dicarbamic acid, it is for example an acyl radical of hexamethylenedicarbamic acid or of 2,4-toluylenedicarbamic acid.

The following compounds are examples of polyalkylpiperidine starting materials useful in making the hydroxylamine derivatives of formula A.

4-hydroxy-2,2,6,6-tetramethylpiperidine,
4-stearoyloxy-2,2,6,6-tetramethylpiperidine,
(di-2,2,6,6-tetramethylpiperidin-4-yl)adipate
(di-2,2,6,6-tetramethylpiperidin-4-yl)sebacate,
dimethyl-bis-(2,2,6,6-tetramethylpiperidine-4-oxy)silane.

If any substituents are $C_5$-$C_7$ cycloalkyl, they are in particular cyclohexyl.

As $C_7$–$C_8$ aralkyl, $R_3$ is particularly phenethyl or above all benzyl.

As $C_2$–$C_{18}$ alkanoyl, $R_3$ for example propionyl, butyryl, octanoyl, dodecanoyl, hexadecanoyl, octadecanoyl, but preferably acetyl; and as $C_3$–$C_5$ alkenoyl, $R_3$ is in particular acryloyl.

If $R_4$ is $C_2$–$C_8$ alkenyl unsubstituted or substituted by a cyano, carbonyl or carbamide group, it is for example 1-propenyl, allyl, methallyl, 2-butenyl, 2-pentenyl, 2-hexenyl, 2-octenyl, 2,2-dicyanovinyl, 1-methyl-2-cyano-2-methoxycarbonyl-vinyl or 2,2-diacetylaminovinyl.

If any substituents are $C_2$–$C_{12}$ alkylene, they are for example ethylene, propylene, 2,2-dimethylpropylene, tetramethylene, hexamethylene, octamethylene, decamethylene or dodecamethylene.

If any substituents are $C_6$–$C_{15}$ arylene, they are for example o-, m- or p-phenylene, 1,4-naphthylene or 4,4'-diphenylene.

As $C_6$–$C_{12}$ cycloalkylene, X is especially cyclohexylene.

The following compounds are examples of polyalkylpiperidine starting materials useful in making the hydroxylamine derivatives of formula B.

N,N'-bis-(2,2,6,6-tetramethylpiperidin-4-yl)-hexamethylene-1,6-diamine,
N,N'-bis-(2,2,6,6-tetramethylpiperidin-4-yl)-hexamethylene-1,6-diacetamide,
4-benzylamino-2,2,6,6-tetramethylpiperidine,
N,N'-bis-(2,2,6,6-tetramethylpiperidin-4-yl)-N,N'-dibutyl-adipamide,
N,N'-bis-(2,2,6,6-tetramethylpiperidin-4-yl)-N,N'-dicyclohexyl-(2-hydroxypropylene),
N,N'-bis-(2,2,6,6-tetramethylpiperidin-4-yl)-p-xylylenediamine,
4-(3-methyl-4-hydroxy-5-tert-butyl-benzoic acetamido)-2,2,6,6-tetramethylpiperidine,
alpha-cyano-β-methyl-β-[N-(2,2,6,6-tetramethylpiperidin-4-yl]-amino-acrylic acid methyl ester.

If $R_5$ is $C_2$–$C_8$ alkylene or hydroxyalkylene, it is for example ethylene, 1-methyl-ethylene, propylene, 2-ethylpropylene or 2-ethyl-2-hydroxymethylpropylene.

As $C_4$–$C_{22}$ acyloxyalkylene, $R_5$ is for example 2-ethyl-2-acetoxymethyl-propylene.

The following compounds are examples of polyalkylpiperidine starting materials useful in making the hydroxylamine derivatives of formula C.

9-aza-8,8,10,10-tetramethyl-1,5-dioxaspiro[5.5]undecane,
9-aza-8,8,10,10-tetramethyl-3-ethyl-1,5-dioxaspiro[5,5]undecane,
2,2,6,6-tetramethylpiperidine-4-spiro-2'-(1',3'-dioxane)5'-spiro-5''-(1'',3''-dioxane)-2''-spiro-4'''-(2''',2''',6''',6'''-tetramethylpiperidine).

If any substituents are $C_2$–$C_6$ alkoxyalkyl, they are for example methoxymethyl, ethoxymethyl, propoxymethyl, tert-butoxymethyl, ethoxyethyl, ethoxypropyl, n-butoxyethyl, tert-butoxyethyl, iropropoxyethyl or propoxypropyl.

If $R_7$ is $C_3$–$C_5$ alkenyl, it is for example 1-propenyl, allyl, methallyl, 2-butenyl or 2-pentenyl.

As $C_7$–$C_9$ aralkyl, $R_7$ is in particular phenethyl or above all benzyl; and as $C_5$–$C_7$ cycloalkyl, $R_7$ is especially cyclohexyl.

If $R_7$ is $C_2$–$C_4$ hydroxyalkyl, it is for example 2-hydroxyethyl, 2-hydroxypropyl, 3-hydroxypropyl, 2-hydroxybutyl or 4-hydroxybutyl.

As $C_6$–$C_{10}$ aryl, $R_7$ is in particular phenyl, or alpha- or β-naphthyl which is unsubstituted or substituted by halogen or $C_1$–$C_4$ alkyl.

If $R_7$ is $C_2$–$C_{12}$ alkylene, it is for example ethylene, propylene, 2,2-dimethylpropylene, tetramethylene, hexamethylene, octamethylene, decamethylene or dodecamethylene.

If $R_7$ is $C_6$–$C_{12}$ arylene, it is for example o-, m- or p-phenylene, 1,4-naphthylene, or 4,4'-diphenylene.

If Z' is $C_2$–$C_{12}$ alkanoyl, it is for example propionyl, butyryl, octanoyl, dodecanoyl or preferably acetyl.

The following compounds are examples of polyalkylpiperidine starting materials useful in making hydroxylamine derivatives of formula D.

3-benzyl-1,3,8-triaza-7,7,9,9-tetramethylspiro[4.5]-decane-2,4-dione,
3-n-octyl-1,3,8-triaza-7,7,9,9-tetramethylspiro[4.5]-decane-2,4-dione,
3-allyl-1,3,8-triaza-1,7,7,9,9-pentamethylspiro[4.5]-decane-2,4-dione,
or the compounds of the following formulae:

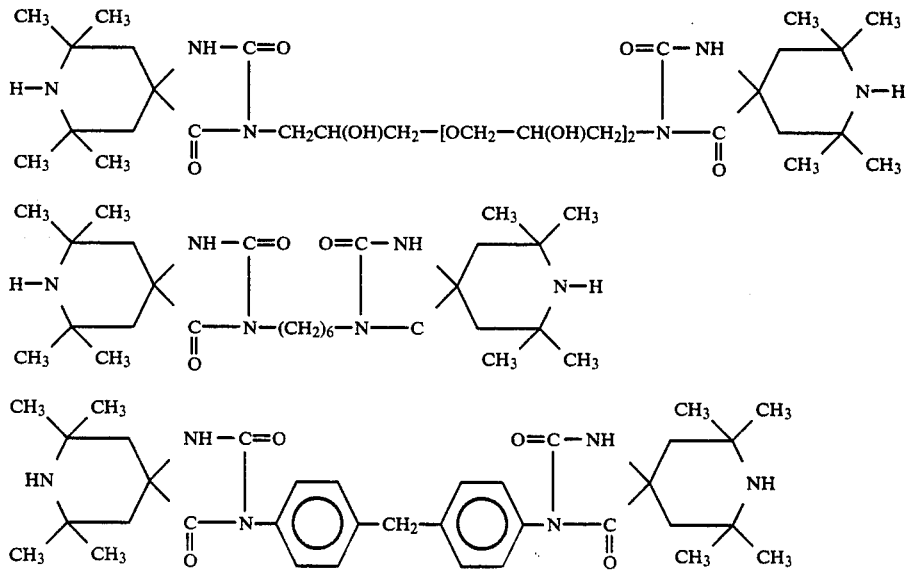

As C$_5$–C$_7$ cycloalkyl, R$_8$ is in particular cyclohexyl.

As C$_6$–C$_{10}$ aryl, R$_8$ is particularly phenyl, or alpha- or β-naphthyl which is unsubstituted or substituted with halogen or C$_1$–C$_4$ alkyl. As C$_1$–C$_3$ alkylene, E is for example methylene, ethylene or propylene.

As C$_2$–C$_6$ alkylene, G is for example ethylene, propylene, 2,2-dimethylpropylene, tetramethylene or hexamethylene; and as C$_6$–C$_{12}$ arylene, G is o-, m- or p-phenylene, 1,4-naphthylene or 4,4'-diphenylene.

The following compounds are examples of polyalkylpiperidine starting materials useful in making the hydroxylamine derivatives of formula E.

N-hydroxymethyl-N'-2,2,6,6-tetramethylpiperidine-4-yl-urea,

N-methoxymethyl-N'-2,2,6,6-tetramethylpiperidin-4-yl-urea,

N-methoxymethyl-N'-n-dodecyl-N'-2,2,6,6-tetramethylpiperidin-4-yl-urea, and

O-(2,2,6,6-tetramethylpiperidin-4-yl)-N-methoxymethylurethane.

When the instant hydroxylamine derivative is of formula F, the following polymeric compounds are examples of starting materials useful in preparing said derivatives.

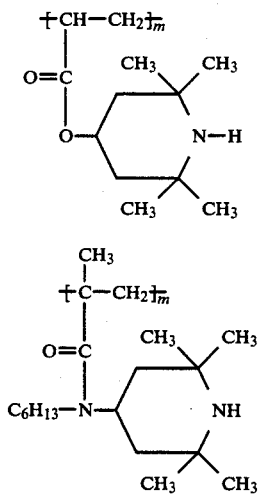

The saturated polyolefins useful in the instant compositions are the polymers, derived from monoolefins, such as polyethylene, which can optionally be crosslinked, polypropylene, polyisobutylene, polybutene-1, poly-3-methylbutene-1 and polymethylpentene-1. Polyethylene may be for example medium density, high density or linear low density polyethylene.

Mixtures of the homopolymers cited above, for example mixtures of polypropylene and polyethylene, polypropylene and polybutene-1, or polypropylene and polyisobutylene and the like, may also be used.

Copolymers of monoolefins may also be used in the instant compositions, for example ethylene/propylene copolymers, propylene/butene-1 copolymers, propylene/octene-1 copolymers, ethylene/butene-1 copolymers, ethylene/octene-1 copolymers as well as ethylene/vinyl acetate copolymers.

The instant compositions particularly employ as the polyolefin component polyethylene, polypropylene, polyisobutylene, poly(butene-1), poly(pentene-1), poly(3-methylbutene-1), poly(4-methyl-pentene-1) and various ethylene or propylene copolymers.

Especially preferred polyolefin substrates are polypropylene, low density polyethylene, medium density polyethylene, high density polyethylene, linear low density polyethylene, poly(butane-1), ethylene/vinyl acetate copolymer, ethylene/propylene copolymer and copolymers of ethylene or of propylene with other alpha olefins.

The most preferred polyolefin substrate is polypropylene, high density polyethylene, ethylene/propylene copolymer or a copolymer of ethylene or of propylene with another alpha olefin.

The phenolic antioxidants useful in the instant compositions embrace a large family of compounds examples of which are given below.

Antioxidants

Simple 2,6-dialkylphenol, such as, for example, 2,6-di-tert.-butyl-4-methylphenol, 2-tert.-butyl-4,6-dimethylphenol, 2,6-di-tert.-butyl-4-methoxymethylphenol 2,6-dioctadecyl-4-methylphenol and 2,6-di-tert-butylphenol.

Derivatives of alkylated hydroquinones, such as for example, 2,5-di-tert.-butyl-hydroquinone, 2,5-di-tert.-amylhydroquinone, 2,6-di-tert.-butyl-hydroquinone, 2,5-di-tert.-butyl-4-hydroxy-anisole, 3,5-di-tert.-butyl-4-hydroxy-anisole, tris-(3,5-di-tert.-butyl-4-hydroxyphenyl)phosphite, 3,5-di-tert.-butyl-4-hydroxyphenyl stearate and bis-(3,5-di-tert.-butyl-4-hydroxyphenyl)adipate.

Hydroxylated thiodiphenyl ethers, such as, for example, 2,2'-thio-bis-(6-tert.-butyl-4-methylphenol), 2,2'-thio-bis-(4-octylphenol), 4,4'-thio-bis-(6-tert.-butyl-3-methylphenol), 4,4'-thio-bis-(3,6-di-sec.-amylphenol), 4,4'-thio-bis-(6-tert.-butyl-2-methylphenol) and 4,4'-bis-(2,6-dimethyl-4-hydroxyphenyl)disulfide.

Alkylidene-bisphenols, such as, for example, 2,2'-methylene-bis-(6-tert.-butyl-4-methylphenol), 2,2'-methylene-bis-(6-tert.-butyl-4-ethylphenol), 4,4'-methylene-bis-(6-tert.-butyl-2-methylphenol), 4,4'-methylene-bis-(2,6-di-tert.-butylphenol), 2,6-di(3,-tert.-butyl-5-methyl-2-hydroxybenzyl)-4-methylphenol, 2,2'-methylene-bis-[4-methyl-6-(α-methylcyclohexyl)-phenol], 1,1-bis(3,5-dimethyl-2-hydroxyphenyl)-butane, 1,1-bis-(5-tert.-butyl-4-hydroxy-2-methylphenyl)-butane, 2,2-bis-(3,5-di-tert.-butyl-4-hydroxyphenyl)-propane, 1,1,3-tris-(5-tert.-butyl-4-hydroxy-2-methylphenyl)-butane, 2,2-bis-(5-tert.-butyl-4-hydroxy-2-methylphenyl)-b 4-n-dodecylmercaptobutane, 1,1,5,5-tetra-(5-tert.-butyl-4-hydroxy-2-methylphenyl)pentane and ethylene glycol bis-[3,3-bis-(3-tert.-butyl-4-hydroxyphenyl)-butyrate].

O-, N- and S-benzyl compounds, such as, for example, 3,5,3',5'-tetra-tert.-butyl-4,4'-dihydroxydibenzyl ether, octadecyl 4-hydroxy-3,5-dimethylbenzyl-mercaptoacetate, tris-(3,5-di-tert.-butyl-4-hydroxybenzyl)-amine and bis-(4-tert.-butyl-3-hydroxy-2,6-dimethylbenzyl)dithioterephthalate.

Hydroxybenzylated malonates, such as for example, dioctadecyl 2,2-bis-(3,5-di-tert.-butyl-2-hydroxybenzyl)-malonate, dioctadecyl 2-(3-tert.-butyl-4-hydroxy-5-methylbenzyl)-malonate, di-dodecylmercapto-ethyl 2,2-bis-(3,5-di-tert.-butyl-4-hydroxybenzyl)-malonate and di-[4-(1,1,3,3-tetramethylbutyl)phenyl]2,2-bis-(3,5-di-tert.-butyl-4-hydroxybenzyl)-malonate.

Hydroxybenzyl-aromatic compounds, such as, for example, 1,3,5-tri-(3,5-di-tert.-butyl-4-hydroxybenzyl)-2,4,6-trimethylbenzene, 1,4-di-(3,5-di-tert-butyl-4-hydroxybenzyl)-2,3,5,6-tetramethylbenzene and 2,4,6-tri(3,5-di-tert.-butyl-4-hydroxybenzyl)-phenol.

s-Triazine compounds, such as, for example, 2,4-bisoctylmercapto-6-(3,5-di-tert.-butyl-4-hydroxyanilino)-s-triazine, 2-octylmercapto,4,6-bis-(3,5-di-tert.-butyl-4-hydroxy anilino)-s-triazine, 2-octylmercapto-4,6-bis-(3,5-di-tert.-butyl-4-hydroxyphenoxy)-s-triazine, 2,4,6-tris-(3,5-di-tert.-butyl-4-hydroxyphenoxy)-s-triazine, 2,4,6-tris-(3,5-di-tert-butyl-4-hydroxyphenylethyl)-s-triazine, 1,3,5-tris-(2,6-dimethyl-3-hydroxy-4-tert-butylbenzyl)isocyanurate and 1,3,5-tris-(3,5-di-tert.-butyl-4-hydroxybenzyl)isocyanurate.

Amides of β-(3,5-di-tert.-butyl-4-hydroxyphenyl)-propionic acid, such as, for example, 1,3,5-tris-(3,5-di-tert.-butyl-4-hydroxyphenyl-propionyl)-hexahydro-s-triazine and N,N'-di(3,5-di-tert.-butyl-4-hydroxyphenyl-propionyl)-hexamethylenediamine. N,N'-bis-β-(3,5-di-t-butyl-4-hydroxyphenyl)-propionylhydrazine.

Esters of β-(3,5-di-tert.-butyl-4-hydroxyphenyl)-propionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, thiodiethylene glycol, triethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo-[2.2.2]octane.

Esters of β-(5-tert.-butyl-4-hydroxy-3-methylphenyl)propionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, triethylene glycol, thiodiethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2.2.2]octane.

Esters of 3,5-di-tert.-butyl-4-hydroxyphenylacetic acid with monohydric or polyhydric alcohols, such as for example, with methanol, ethanol, octadecanol, 1,6-hexanediol, 1,9-nonanediol, ethylene glycol, 1,2-propenediol, diethylene glycol, thio-diethylene glycol, neopentylglycol, pentaerythritol, 3-thia-undecanol, 3-thia-pentadecanol, trimethylhexanediol, trimethyloletahne, trimethylolpropane, tris-hydroxyethyl isocyanurate and 4-hydroxymethyl-1-phospha-2,6,7-trioxabicyclo[2.2.2]octane, especially the tetrakis ester of pentaerythritol.

Benzylphosphonates, such as, for example, dimethyl 3,5-di-tert.-butyl-4-hydroxybenzylphosphonate, diethyl 3,5-di-tert.-butyl-4-hydroxybenzylphosphonate, dioctadecyl 3,5-di-tert.-butyl-4-hydroxybenzylphosphonate and dioctadecyl 5-tert.-butyl-4-hydroxy-3-methylbenzylphosphonate.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinnamate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl4-tert-butyl-3-hydroxybenzyl)isocyanurate, 1,1,3-tris(2-methyl-4-hydroxy-5-tert-butylphenyl)butane, 1,3,5-tris[2-(3,5-di-tert-butyl-4-hydroxyhydrocinnamoyloxy)ethyl]isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxycinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis[2-(3,5-di-tert-butyl-4-hydroxyhydrocinnamoyloxy)ethyl]oxamide.

A most preferred embodiment has as the phenolic antioxidant, neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol or 2,2'-ethylidene-bis(4,6-di-tert-butylphenol).

When the instant compositions contain an organic phosphorus compound, such compounds may be for example, triphenyl phosphite, diphenylalkyl phosphites, phenyldialkyl phosphites, tri-(nonylphenyl)phosphite, trilauryl phosphite, trioctadecyl phosphite, di(isodecyloxy)-2,4,8,10-tetraoxa-3,9-diphospha-[5.5]-undecane and tri-(4-hydroxy-3,5-di-tert.butylphenyl)phosphite or similar phosphonites.

The organic phosphorus compound of particular interest is selected from the group consisting of tris(2,4-di-tert-butylphenyl)phosphite, 3,9-di(2,4-di-tert-butylphenoxy)-2,4,8,10-tetraoxa-3,9-diphospha[5.5]undecane, tris(p-nonylphenyl)phosphite, 3,9-distearyloxy-2,4,8,10-tetraoxa-3,9-diphospha[5.5]undecane, dilauryl phosphite, 3,9-di[2,6-di-tert-butyl-4-(2-(n-octadecyloxycarbonyl)ethyl)-phenoxy]-2,4,8,10-tetraoxa-3,9-diphospha[5.5]undecane and tetrakis(2,4-di-tert-butylphenyl) 4,4'-bis(diphenylene)phosphonite. Tris(2,4-di-tert-butylphenyl)phosphite is especially preferred.

When the instant compositions contain a thiosynergist, such thiosynergists may be for example dilauryl thiodipropionate, distearyl thiodipropionate or neopentanetetrayl tetrakis(3-dodecylthiopropionate). Distearyl thiodipropionate or dilauryl thiodipropionate is particularly preferred.

When the instant compositions contain an alkaline metal salt of a fatty acid, such salts are the alkali metal, alkaline earth metal, zinc, cadmium or aluminum salts of the higher fatty acids for example calcium stearate, zinc stearate, magnesium behenate, sodium recinoleate or potassium palmitate. Calcium stearate is particularly preferred.

When the instant compositions contain a hindered amine light stabilizer, such hindered amines may for example be 4-benzoyl-2,2,6,6-tetramethylpiperidine, 4-stearyloxy-2,2,6,6-tetramethylpiperidine, bis-(2,2,6,6-tetramethylpiperidyl)sebacate or 3-n-octyl-7,7,9,9-tetramethyl-1,3,8-triaza-spiro[4.5]decane-2,4-dione.

The hindered amine light stabilizer of particular interest is selected from the group consisting of bis(2,2,6,6-tetramethylpiperidin-4-yl)sebacate, bis(1,2,2,6,6-pentamethylpiperidin-4-yl)sebacate, di(1,2,2,6,6-pentamethylpiperidin-4-yl) (3,5-di-tert-butyl-4-hydroxybenzyl)butylmalonate, tris(2,2,6,6-tetramethylpiperidin-4-yl)nitrilotriacetate, 1,2-bis(2,2,6,6,-tetramethyl-3-oxopiperazin-4-yl)ethane, 2,2,4,4-tetramethyl-7-oxa-3,20-diaza-21-oxodispiro[5.1.11.2]heneicosane, polycondensation product of 2,4-dichloro-6-tert-octylamino-s-triazine and 4,4'-hexamethylenebis(amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis(amino-2,2,6,6-tetramethylpiperidine) and 1,2-dibromoethane, polycondensation product of 2,4-dichloro-6-morpholino-s-triazine and 4,4'-hexamethylenebis(amino-2,2,6,6-tetramethylpiperidine), N,N'N'',N'''-tetrakis[(4,6-bis(butyl-(2,2,6,6-tetramethylpiperidin-4-yl)-amino-s-triazin-2-yl]-1,10-diamino-4,7-diazadecane, octamethylene bis(2,2,6,6-tetramethylpiperidin-4-carboxylate) and 4,4'-ethylenebis(2,2,6,6-tetramethylpiperazin-3-one).

A most preferred embodiment has as the hindered amine light stabilizer bis(2,2,6,6-tetramethylpiperidin-4-yl)sebacate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis(amino-2,2,6,6-tetramethylpiperidine) or N,N',N'',N'''-tetrakis[(4,6-bis(butyl-(2,2,6,6-tetramethyl-piperidin-4-yl)amino)-s-triazin-2-yl]-1,10-diamino-4,7-diazadecane.

When the instant compositions contain an ultraviolet light absorber, such light absorbers may include the 2H-benzotriazoles, the benzophenones, the oxanilides, the alpha-cyanocinnamates the substituted benzoate esters or the nickel salts of the O-alkyl hindered phenolic benzylphosphonates.

Examples of such ultraviolet light absorbers are seen below.

UV-Absorbers 2-(2'-Hydroxyphenyl)-benzotriazoles, e.g., the 5'-methyl-, 3',5'-di-tert.-butyl-, 5'-tert.-butyl-, 5'-(1,1,3,3-tetramethylbutyl)-, 5-chloro-3',5'-di-tert.-butyl-, 5-chloro-3'-tert.-butyl-5'-methyl-, 3'-sec.-butyl-5'-tert.-butyl-, 3'-α-methylbenzyl-5'-methyl, 3'-α-methylbenzyl-5'-methyl-5-chloro-, 4'-hydroxy-, 4'-methoxy-, 4'-octoxy-, 3',5'-di-tert.-amyl-, 3'-methyl-5'-carbomethoxyethyl- and 5-chloro-3',5'-di-tert.-amyl-derivative.

2,4-bis-(2'-Hydroxyphenyl)-6-alkyl-s-triazines, e.g., the 6-ethyl-, 6-heptadecyl- or 6-undecyl-derivative.

2-Hydroxybenzophenones e.g., the 4-hydroxy, 4-methoxy-, 4-octoxy-, 4-decyloxy-, 4-dodecyloxy-, 4-benzyloxy-, 4,2',4'-trihydroxy-, 2,2',4,4'-tetrahydroxy- or 2'-hydroxy-4,4'-dimethoxy-derivative.

1,3-bis-(2'-Hydroxybenzoyl)-benzenes, e.g., 1,3-bis-(2'-hydroxy-4'-hexyloxy-benzoyl)-benzene, 1,3-bis-(2'-hydroxy-4'-octyloxy-benzoyl)-benzene or 1,3-bis-(2'-hydroxy-4'-dodecyloxybenzoyl)-benzene.

Esters of optionally substituted benzoic acids, e.g., phenylsalicylate, octylphenylsalicylate, dibenzoylresorcin, bis-(4-tert.-butylbenzoyl)-resorcin, benzoylresorcin, 3,5-di-tert.-butyl-4-hydroxybenzoic acid-2,4-di-tert.-butylphenyl ester or -octadecyl ester or -2-methyl-4,6-di-tert.-butyl ester.

Acrylates, e.g., α-cyano-β,β-diphenylacrylic acid-ethyl ester or isooctyl ester, α-carbomethoxy-cinnamic acid methyl ester, α-cyano-β-methyl-p-methoxy-cinnamic acid methyl ester or -butyl ester or N(β-carbomethoxyvinyl)-2-methyl-indoline.

Oxalic acid diamides, e.g., 4,4'-di-octyloxy-oxanilide, 2,2'-di-octyloxy-5,5'-di-tert.-butyl-oxanilide, 2,2'-didodecyloxy-5,5'-di-tert.-butyl-oxanilide, 2-ethoxy-2'-ethyl-oxanilide, N,N'-bis(3-dimethyl-aminopropyl)-oxalamide, 2-ethoxy-5-tert.-butyl-2'-ethyloxanilide and the mixture thereof with 2-ethoxy-2'-ethyl-5,4'-di-tert.-butyl-oxanilide, or mixtures of ortho- and para-methoxy- as well as of o- and p-ethoxy-disubstituted oxanilides.

Preferably the ultraviolet light absorber used in the instant compositions is 2-(2-hydroxy-5-methylphenyl)-2H-benzotriazole, 2-(2-hydroxy-3,5-di-tert-amylphenyl)-2H-benzotriazole, 2-[2-hydroxy-3,5-di-(alpha,alpha-dimethylbenzyl)phenyl]-2H-benzotriazole, 2-(2-hydroxy-5-tert-octylphenyl)-2H-benzotriazole, 2-hydroxy-4-octyloxybenzophenone, nickel bis(O-ethyl 3,5-di-tert-butyl-4-hydroxybenzylphosphonate), 2,4-dihydroxybenzophenone, 2-(2-hydroxy-3-tert-butyl-5-methylphenyl)-2H-benzotriazole, nickel butylamine complex with 2,2'-thiobis(4-tert-butylphenol), 2-ethoxy-2'-ethyloxanilide or 2-ethoxy-2'-ethyl-5,5'-di-tert-butyloxanilide.

The stabilized polyolefin compositions of the instant invention may also contain other additives such as the pigments, colorants or dyes, light stabilizers such as metal deactivators, talc and other fillers, etc.

In general, the hydroxylamine stabilizers of this invention are employed from about 0.01 to about 5% by weight of the stabilized composition, although this will vary with the particular substrate and application. An advantageous range is from about 0.025 to about 2%, and especially 0.05 to about 1%.

The hydroxylamine compounds of this invention stabilize polyolefins especially during high temperature processing with relatively little change in color, even though the polymer may undergo a number of extrusions.

The instant stabilizers may readily be incorporated into the polyolefins by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The stabilized polyolefin compositions of the invention may optionally also contain from about 0.01 to about 5%, preferably from about 0.025 to about 2%, and especially from about 0.1% to about 0.05%, by weight of various conventional additives, such as the following, or mixtures thereof:

The following may be mentioned as examples of further additives that can be used in the instant compositions.

Metal deactivators, e.g., oxanilide, isophthalic acid dihydrazide, sebacic acid-bis-phenylhydrazide, bis-benzylideneoxalic acid dihydrazide, N,N'-diacetal-adipic acid dihydrazide, N,N'-bis-salicyloyl-oxalic acid dihydrazide, N,N'-bis-salicyloylhydrazine, N,N'-bis-(3,5-di-tert.-butyl-4-hydroxyphenylpropionyl)hydrazine, N-salicyloyl-N'-salicylalhydrazine, 3-salicyloyl-amino-1,2,4-triazole or N,N'-bis-salicyloyl-thiopropionic acid dihydrazide.

Nucleation agents, e.g., 4-tert.-butylbenzoic acid, adipic acid, diphenylacetic acid or substituted sorbitols such as 1,3; 2,4-dibenzylidenesorbitol.

Other additives that can be incorporated in the stabilized compositions are antiblocking agents, clarifiers, antiozonants, lubricants such as stearyl alcohol, fillers, carbon black, asbestos, kaolin, talc, glass fibers, pigments, optical brighteners, flameproofing agents and antistatic agents.

While the stabilizers of this invention may be conveniently incorporated by conventional techniques into polyolefins before the fabrication thereof into shaped articles, it is also possible to apply the instant stabilizers by a topical application to the finished articles. This is particularly useful with fiber applications where the instant stabilizers are applied topically to the fibers, for example, by way of a spin finish during the melt spinning process.

The following examples are presented for the purpose of illustration only and are not to be construed to limit the nature of scope of the instant invention in any manner whatsoever.

EXAMPLE 1

1,1'-Ethylenebis-(4-hydroxy-3,3,5,5-tetramethylpiperazin-2-one)

A 4.0 molar solution of tert-butyl hydroperoxide (18.0 grams, 0.2 mole) in 1,2-dichloroethane is added dropwise over a 25-minute period to a refluxing mixture of 1,1'-ethylenebis-(3,3,5,5-tetramethylpiperazin-2-one) (16.9 grams, 0.05 mole), molybdenum hexacarbonyl (0.2 gram) and 150 ml of 1,2-dichloroethane. The mixture is refluxed for an additional hour, then cooled to room temperature and washed twice with 200 ml of water.

Methanol (75 ml) is added to the organic layer along with 0.35 gram of platinum oxide catalyst. The mixture is then hydrogenated at ambient temperature for one hour at 50 psi (3.5 kg/cm$^2$). The catalyst is then removed by filtration and the filtrate concentrated to 200 ml by evaporation. Upon cooling the concentrated solution, the above-named product is obtained in a yield of 15.2 grams (82%) as a white solid melting at 190°–193° C.

Analysis: Calculated for $C_{18}H_{34}N_4O_4$: C, 58.4; H, 9.3; N, 15.1. Found: C, 58.5; H, 9.3; N, 15.0.

EXAMPLE 2

3-Hydroxy-2,2,4,4-tetramethyl-7-oxa-3,20-diazadispiro[5.1.11.2]heneicosan-21-one Following the general procedure of Example 1, 9.0 grams (0.1 mole) of tert-butyl hydroperoxide in a 1,2-dichloroethane solution is added dropwise over a 15-minute period to a refluxing mixture of 18.3 grams (0.05 mole) of 2,2,4,4-tetramethyl-7-oxa-3,20-diazadispiro[5.1.11.2]heneicosan-21-one and 0.3 gram of molybdenum hexacarbonyl in 100 ml of 1,2-dichloroethane. The mixture is refluxed for three hours, then cooled, washed twice with 200 ml of water, and filtered.

To the filtrate is added 50 ml of methanol and 1.3 grams of 5% palladium-on-charcoal catalyst. The mixture is hydrogenated at ambient temperature for 30 minutes at 50 psi (3.5 kg/cm$^2$). The solvents are removed by evaporation and the residue is taken up in hot dioxane. The catalyst is removed by filtration and the filtrate upon cooling gives the above-named product in a yield of 5.5 grams (29%) as a white powder melting at 236°–238° C.

Analysis: Calculated for $C_{22}H_{40}N_2O_3$: C, 69.4; H, 10.6; N, 7.4. Found: C, 69.2; H, 10.4; N, 7.2.

EXAMPLE 3

1,1'-Sebacoyl-bis(3-hydroxy-2,2,4,4,6-pentamethylhexahydropyrimidine)

Following the general procedure of Example 1, 6.6 grams (0.073 mole) of tert-butyl hydroperoxide in toluene solution is added over a 20-minute period to a solution of 5.8 grams (0.0121 mole) of 1,1'-Sebacoyl-bis(3-hydroxy-2,2,4,4,6-pentamethylhexahydropyrimidine) in 20 ml of toluene at 85° C. To this solution is added in small portions 0.3 gram of molybdenum hexacarbonyl. The mixture is heated at 85° C. for another three hours, then cooled and dried over anhydrous magnesium sulfate. The solvent is removed by evaporation and the residual red oil is purified by flash column chromatography (silica gel; methylene chloride:methanol, 9:1).

The solutions containing the N-oxyl intermediate are evaporated and the residue together with 75 ml of methanol are hydrogenated using 0.5 gram of 5% palladium-on-charcoal catalyst as described in Example 2.

The above-named product is obtained as a colorless glass which is recrystallized from ethyl acetate to give 4.0 grams (65% yield) of white solid, melting at 171°–179° C.

Analysis: Calculated for $C_{28}H_{54}N_4O_4$: C, 65.9; H, 10.7; N, 11.0. Found: C, 65.5; H, 11.0; N, 10.9.

EXAMPLE 4

Hydroxylamine Derivative of the Polycondensation Product of 2,4-Dichloro-6-tert-octylamino-s-triazine and 4,4'-Hexamethylenebis-(amino-2,2,6,6-tetramethylpiperidine)

Following the general procedure of Example 3, 30 grams (0.05 mole) of the above-named condensation product is heated in 100 ml of toluene to 85°–90° C. To this hot solution is added 0.1 gram of molybdenum hexacarbonyl and then dropwise over a 30-minute period a solution of 9.9 grams (0.11 mole) of tert-butyl hydroperoxide in 25 ml of toluene. A second 0.1 gram portion of molybendum hexacarbonyl is added, and the mixture is heated for one hour at 85°–90° C. A third 0.1 gram portion of molybdenum hexacarbonyl is added and the mixture is heated for another two hours at 85°–90° C. The mixture is cooled to under 40° C. and placed in a hydrogenation apparatus. Three successive 0.1 gram portions of 5% palladium-on-charcoal catalyst are needed to effect complete hydrogenation to the desired hydroxylamine derivative as seen by hydrogen uptake.

The catalyst is removed by filtration and the filtrate is concentrated by evaporation to 60 ml volume. This solution is poured into hexane to give a viscous tacky precipitate. The precipitate is isolated by decantation to give a tacky oil which air dried to a glass. This glass is dissolved in ethanol and then poured onto ice to give the above-named product in a yield of 6.7 grams (21%) as a fine white powder melting at 172°–176° C.

Analysis: Calculated for $C_{35}H_{66}N_8O_2$: C, 66.6; H, 10.5; N, 17.8. Found: C, 67.8; H, 10.5; N, 17.5.

EXAMPLE 5

N,N',N'',N'''-Tetrakis[4,6-bis-(butyl-(1-oxyl-2,2,6,6-tetramethyl-piperidin-4-yl)amino)-s-triazin-2-yl]-1,10-diamino-4,7-diazadecane A solution of 40.0 grams (0.0184 mole) of N,N',N'',N'''-Tetrakis[4,6-bis-(butyl-(2,2,6,6-tetramethyl-piperidin-4-yl)amino)-s-triazin-2-yl]-1,10-diamino-4,7-diazadecane in 100 ml of toluene is heated to 85°–90° C. in a 500-ml, three necked flask fitted with a reflux condenser. To the solution is added 8.0 grams (0.08 mole) of tert-butyl hydroperoxide in 20 ml of toluene followed by 0.2 gram of molydenum hexacarbonyl. The solution becomes reddish as a vigorous and exothermic reaction occurs. When the exotherm subsides, another 0.2 gram of molybdenum hexacarbonyl is added, and then 31.8 grams (0.32 mole) of tert-butyl hydroperoxide are added over a 30-minute period of 85°–90° C. At this point another 0.2 gram of molybdenum hexacarbonyl is added and the mixture is stirred at 85°–90° C. for another two hours, and then at room temperature for 16 hours.

The solution is washed with 200 ml of 10% aqueous sodium bisulfite solution, then twice with 200 ml of water and finally with 200 ml of saturated sodium chloride solution. The organic layer is dried over anhydrous magnesium sulfate and concentrated to a volume of 80 ml. The solution is then passed through silica gel with hexane: ethyl acetate (2:1) to give concentrates yielding 38.2 grams (91%) of the red oxyl product being at least 95% pure as seen by thin layer chromatography.

EXAMPLE 6

N,N',N'',N'''-Tetrakis[4,6-bis-(butyl-(1-hydroxy-2,2,6,6-tetramethyl-piperidin-4-yl)amino)-s-triazin-2-yl]-1,10-diamino-4,7-diazadecane 38.0 grams (0.0166 mole) of the oxyl product prepared in Example 5, 200 ml of ethanol, 1.0 gram of 5% palladium-on-charcoal are placed in a hydrogenation apparatus. Hydrogenation is carried out as described in Example 2 till hydrogen uptake ceases.

The catalyst is removed by filtration, and the ethanol is stripped off. The residue remaining is triturated in hexane to give the above-named product in a yield of 33.3 grams (87%) as fine white powder melting at 147°–154° C.

Analysis: Calculated for $C_{124}H_{234}N_{32}O_8$: C, 64.0; H, 10.1; N, 19.2. Found: C, 65.0; H, 10.3; N, 18.7.

EXAMPLE 7

Hydroxylamine Derivative of the Polycondensation Product of 2,4-Dichloro-6-morpholino-s-triazine and 4,4'-Hexamethylenebis-(amino-2,2,6,6-tetramethyl-piperidine)

A mixture of 19.9 grams (0.0175 mole) of the polycondensation product named above, 2.0 grams of molybdenum trioxide and 100 ml of toluene are heated to 85° C. To this hot mixture is added 12.9 grams (0.144 mole) of tert-butyl hydroperoxide in 30 ml of toluene over a 20-minute period at 85°–92° C. Heating is continued for another three hours to complete the reaction. The mixture is then cooled to room temperature, passed through silica gel and allowed to stand overnight. A sediment formed which is removed by filtration. The toluene solvent is evaporated and replaced by 100 ml of ethanol.

This red solution is placed in a hydrogenation apparatus with 1.0 gram of 5% palladium-on-charcoal catalyst. Hydrogenation is carried out as described in Example 2. The catalyst is removed by filtration. The ethanol is stripped off to give a residue which is dissolved in 30 ml of toluene. The toluene solution is added dropwise to vigorous stirred hexane under nitrogen to give the above-named product in a yield of 12.3 grams (59%) as a solid melting at 155°–160° C.

Analysis: Calculated for $C_{31}H_{56}N_8O_3$: C, 63.2; H, 9.6; N, 19.0. Found: C, 63.2; H, 9.4; N, 18.1.

EXAMPLE 8

15-n-Octadecyl-7-hydroxy-7,15-diazadispiro[5,1,5,3-]hexadecane-14,16-dione

This compound is also named 2-n-octadecyl-4,4;6,6-di(pentamethylene)-5-hydroxy-1,3-dioxo-2.5-diazacyclohexane and is prepared by the method given in Example 8 of U.S. Pat. No. 3,936,456.

EXAMPLE 9

Preparation of di-(1-hydroxy-2,2,6,6-tetramethylpiperidine-4-yl)sebacate

A solution containing 15.0 g (31.2 mmole) of di-(2,2,6,6-tetramethylpiperidin-4-yl)sebacate and 0.2 g molybdenum hexacarbonyl, $Mo(CO)_6$, (0.76 mmole) in 100 ml 1,2-dichloroethane is brought to reflux. Tert-butyl hydroperoxide (31.5 ml, 4M solution in 1,2-dichloroethane, 126 mmole) is added within 15 minutes and the solution is refluxed for 2.5 hours. The solution is cooled to room temperature, washed twice with 100 ml water, and the organic phase transferred to a hydrogenation flask. Catalytic hydrogenation is carried out at room temperature and with a hydrogen pressure of 40 psi (2.8 $Kg/cm^2$) to yield the hydroxylamine. The palladium/charcoal catalyst is removed by filtration and the solvent is evaporated. The solid is then recrystallized from ethanol-water (4:1, 250 ml), under a blanket of nitrogen to prevent oxidation of the product. A colorless solid is obtained (13.6 g, 85% yield) m.p. 129°–134° C. (lit. m.p. 101° C.). (E. F. Litvin, et al, Zh, Org. Khim, 6, 2365 (1970)=CA, 74, 64180u (1971))

EXAMPLE 10

Preparation of 4-benzoyloxy-1-hydroxy-2,2,6,6-tetramethylpiperidine

A solution containing 26.2 g (0.1 mole) of (2,2,6,6-tetramethylpiperidin-4-yl)benzoate and 0.2 g molybdenum hexacarbonyl, $Mo(CO)_5$, in 20 ml toluene is warmed to 60° C. Cumene hydroperoxide (38.1 g of 80% solution, c.a. 0.2 mole) is added over a 45 minute period, giving a slightly exothermic reaction. Then the red solution is heated for another 30 miutes at 65° and transferred to a hydrogenation bottle.

The material is hydrogenated in the presence of 0.6 g 5% palladium-on-charcoal at 50 psi (3.5 $Kg/cm^2$) for 3 hours. The catalyst is then removed by filtration and washed with 100 ml of chloroform.

The filtrate is stripped of chloroform, and 100 ml of hot hexane is added. The mixture is cooled and 20.0 g (72% yield) of white precipitate is collected: m.p. 145°–149° C. (lit 135°–146° C.; V. A. Golubev, et al., Izv, Akad, Nauk, SSSR, Ser. Khim. 1965, 1927=CA, 64, 11164e (1966).

EXAMPLE 11

1-Hydroxy-2,2,6,6-tetramethyl-4-(3,5-di-tert-butyl-4-hydroxyhydrocinnamoyloxy)piperidine This compound is prepared following the general procedure of Example 10 when an equivalent amount of 2,2,6,6-tetramethylpiperidin-4-yl 3,5-di-tert-butyl-4-hydroxyhydrocinnamate is substituted for the corresponding benzoate ester.

EXAMPLE 12

N-(1-Hydroxy-2,2,6,6-tetramethyl-piperidin-4-yl)-epsilon-caprolactam

This compound is prepared by the method given in Example 15 of U.S. Pat. No. 4,472,547.

EXAMPLE 13

Processing Stability of Polypropylene at 500° F. (260° C.)

The base formulation comprises 100 parts of unstabilized polypropylene (Profax 6501, Hercules) with 0.10 parts of calcium stearate. The test stabilizers are solvent blended onto the polypropylene from solutions in methylene chloride. After removal of the solvent by evaporation under reduced pressure, the stabilized resin formulation is extruded at 100 rpm from a 1 inch (2.54 cm) diameter extruder under the following extruder conditions:

| Extruder Location | Temperature | |
|---|---|---|
| | °F. | °C. |
| Cylinder #1 | 450 | 232 |
| Cylinder #2 | 475 | 246 |
| Cylinder #3 | 500 | 260 |
| Die #1 | 500 | 260 |
| Die #2 | 500 | 260 |

During extrusion, the internal extruder pressure is determined using a pressure transducer. After each of the first, third and fifth extrusions, resin pellets are compression molded into 125 mil (3.2 mm) thick plaques at 380° F. (193° C.) and specimen yellowness index (YI) is determined according to ASTM D1925. Low YI values indicate less yellowing.

If the transducer pressure after the fifth extrusion is nearly as high as after the first extrusion, the polypropylene is being well stabilized by the given stabilization formulation.

Results are seen in Table I.

It is clear from the data in Table I that the presence of a hydroxylamine derived from a hindered amine in the polypropylene composition containing a phenolic antioxidant greatly reduces color formation associated with the presence of the phenolic antioxidant while the phenolic antioxidant still stabilizes the polypropylene effectively from degradation after heating.

TABLE I

| | Processing Stability of Polypropylene at 500° F. (260° C.) | | | | | | |
|---|---|---|---|---|---|---|---|
| | Conc. Stabilizer | Transducer Pressure after Extrusion psi/(kg/cm$^2$) | | | Yellowness Index Color After Extrusion | | |
| Stabilizer* | % by wt. | 1 | 3 | 5 | 1 | 3 | 5 |
| Base formulation | — | 615/43.0 | 570/39.9 | 510/35.7 | 4.3 | 6.1 | 7.4 |
| Antioxidant A | 0.1 | 690/48.3 | 675/47.3 | 630/44.1 | 7.2 | 11.7 | 15.3 |
| Antioxidant A (0.1%) plus | | | | | | | |
| Compound 1 | 0.05 | 735/51.5 | 720/50.4 | 675/47.3 | 5.0 | 7.9 | 11.1 |
| Compound 2 | 0.05 | 750/52.5 | 735/51.5 | 70/49.0 | 7.1 | 9.5 | 11.7 |
| Compound 3 | 0.05 | 750/52.5 | 730/51.1 | 690/48.3 | 6.7 | 9.0 | 11.2 |
| Compound 4 | 0.05 | 720/50.4 | 735/51.5 | 705/49.4 | 7.0 | 9.2 | 11.2 |

*Antioxidant A = neopentanetetrayl tetrakis(3,5-di-tert-butyl-4-hydroxyhydrocinnamate).
Compound 1 = di(1-hydroxy-2,2,6,6-tetramethylpiperidin-4-yl) sebacate.
Compound 2 = 1-hydroxy-2,2,6,6-tetramethyl-4-benzoxypiperidine.
Compound 3 = 1-hydroxy-2,2,6,6-tetramethyl-4-(3,5-di-tert-butyl-4-hydroxyhydrocinnamoyloxy)-piperidine.
Compound 4 = N—(1-hydroxy-2,2,6,6-tetramethylpiperidin-4-yl)-epsilon-caprolactam.

EXAMPLE 14

Processing Stability of Polypropylene at 500° F. (260° C.)

Following the exact procedure of Example 13, polypropylene compositions containing, in addition to a phenolic antioxidant, an organic phosphorus compound are tested for processing stability in respect to repeated extrusions at 500° F. (260° C.) by measuring transducer pressures and yellowness index values. The results are seen on Table II.

TABLE II

| | Processing Stability of Polypropylene at 500° F. (260° C.) | | | | | | |
|---|---|---|---|---|---|---|---|
| | Conc. Stabilizer | Transducer Pressure after Extrusion psi/(Kg/cm$^2$) | | | Yellowness Index Color After Extrusion | | |
| Stabilizer* | % by wt. | 1 | 3 | 5 | 1 | 3 | 5 |
| Base formulation | — | 630/44.1 | 555/38.9 | 540/37.8 | 3.3 | 3.4 | 3.6 |
| Antioxidant A | 0.1 | 765/53.6 | 765/53.6 | 715/50.0 | 9.0 | 9.4 | 10.5 |
| Antioxidant A plus Phosphorus I | 0.05 0.05 | 735/51.5 | 765/53.6 | 720/50.4 | 7.7 | 11.2 | 14.2 |
| Antioxidant A plus Phosphorus I | 0.075 0.075 | 735/51.5 | 773/54.2 | 750/52.5 | 6.8 | 8.9 | 10.5 |
| Antioxidant A (0.05) plus Phosphorus I (0.05), plus | | | | | | | |
| Compound 5 | 0.05 | 745/52.2 | 765/53.6 | 760/53.3 | 5.5 | 6.0 | 6.3 |

*Antioxidant A = neopentanetetrayl tetrakis(3,5-di-tert-butyl-4-hydroxyhydrocinnamate).
Phosphorus I = tris(2,4-di-tert-butylphenyl) phosphite
Compound 5 = 2-n-octadecyl-4,4;6,6-di(pentamethylene)-5-hydroxy-1,3-dioxo-2,5-diazacyclohexane.

The results on Table II show that the instant hydroxylamine derivative significantly reduces discoloration associated with the high temperature extrusion of polypropylene containing a phenolic antioxidant and an organic phosphite processing stabilizer.

EXAMPLE 15

Processing Stability of Polypropylene at 500° (260° C.)

Following the procedure of Example 13, additional polypropylene compositions containing a phenolic antioxidant and an instant hydroxylamine derivative are examined in respect to process stability at elevated temperature. The results are given on Table III.

TABLE III

Processing Stability of Polypropylene at 500° F. (260° C.)

| Stabilizer* | Conc. Stabilizer % by wt. | Transducer Pressure after Extrusion psi/(Kg/cm$^2$) | | | Yellowness Index Color After Extrusion | | |
|---|---|---|---|---|---|---|---|
| | | 1 | 3 | 5 | 1 | 3 | 5 |
| Base formulation | — | 585/41.0 | | 375/36.3 | 5.0 | | 6.2 |
| Antioxidant A | 0.1 | 690/48.3 | | 450/31.5 | 12.8 | | 19.1 |
| Antioxidant A plus Compound 1 | 0.1 0.05 | 720/5.4 | | 560/39.2 | 6.2 | | 7.5 |

*Antioxidant A = neopentanetetrayl tetrakis(3,5-di-tert-butyl-4-hydroxyhydrocinnamate)
Compound 1 = di(1-hydroxy-2,2,6,6-tetramethylpiperidin-4-yl) sebacate.

EXAMPLE 16

Unstabilized polypropylene powder (Hercules Profax 6501) containing 0.10% calcium stearate is thoroughly blended with the indicated amount of additive. The blended materials are then milled on a two roll mill at 182° C. for 5 minutes, after which time the stabilized polypropylene is sheeted from the mill and allowed to cool. The milled polypropylene is then cut into pieces and compression molded on a hydraulic press at 220° C. and 175 psi (1.2×10$^6$ Pa) into 5 mil (0.127 mm) thick film. The sample is exposed in a fluorescent sunlight/black light (FS/BL) chamber till failure. Failure is taken as the hours required to reach 0.5 carbonyl absorbance by infrared spectroscopy on the exposed film.

| Stabilizer* | Amount of Stabilizer wt % | Time to Failure Hours |
|---|---|---|
| None | — | 390 |
| Compound 6 | 0.25 | 2070 |
| Compound 6 | 0.5 | 2620 |

*Compound 6 = 1,1'-ethylenebis-(4-hydroxy-3,3,5,5-tetramethylpiperazin-2-one)

Compound 6 is an effective stabilizer for polypropylene exposed to ultraviolet radiation.

EXAMPLE 17

Bis-(1-hydroxy-2,2,6,6-tetramethylpiperidin-4-yl) n-Butyl-(3,5-di-tert-butyl-4-hydroxybenzyl)malonate A 4.8M solution of tert-butyl hydroperoxide (168 ml, 0.808 mole in 1,2-dichloroethane) is added over a 30-minute period to a solution of di-(2,2,6,6-tetramethylpiperidin-4-yl) n-butylmalonate (58.8 grams, 0.135 mole) in 150 ml of 1,2-dichloroethane at 75° C. Molybdenum hexacarbonyl (0.9 gram) is added in small portions over the addition period and the mixture is heated for one hour. The mixture is filtered and the filtrate is washed with water and dried over anhydrous magnesium sulfate.

Catalytic hydrogenation is carried out at ambient temperature using 2.0 grams of platinum oxide catalyst for one hour at 50 psi (3.5 Kg/cm$^2$) pressure of hydrogen.

After removing the catalyst by filtration, the filtrate is evporated dryness. The residue is dissolved in 200 ml of ethyl acetate and acetylated with 30.3 grams, 0.297 mole of acetic anhydride by heating for one hour at 50° C. The solution is evaporated and the residue dissolved in 500 ml of ether. The ether solution is washed with saturated sodium carbonate solution, dried and evaporated. The residue is taken up in 200 ml of hexane and the desired intermediate, di-(1-acetoxy-2,2,6,6-tetramethylpiperidin-4-yl) n-butylmalonate, is isolated as a white solid melting at 125°–127° C.

The above named intermediate (27.6 grams, 0.05 mole) is dissolved in 90 ml of tetrahydrofuran. To this solution is added 16.5 grams, 0.0625 mole of the Mannich base, 4-dimethylaminomethyl-2,6-di-tert-butylphenol, in 50 ml of tetrahydrofuran. The mixture is refluxed for two hours in the presence of lithium diisopropylamide (0.01 mole), prepared in 25 ml of dry tetrahydrofuran. The reaction mixture is then washed successively with hydrochloric acid (300 ml), then saturated sodium bicarbonate solution (150 ml) and dried. Di-(1-acetoxy-2,2,6,6-tetramethylpiperidin-4-yl) n-butyl-(3,5-di-tert-butyl-4-hydroxybenzyl)malonate intermediate product recrystallized from hexane is obtained (25.7 grams, 66% yield) as a white solid, melting at 174°–175° C.

Analysis: Calcd for C$_{44}$H$_{22}$N$_2$O$_9$: C, 68.4; H, 9.3; N, 3.6. Found: C, 68.1; H, 9.4; N, 3.8.

A mixture of the above-named acetoxy intermediate product (7.0 grams, 0.0091 mole), ethanolamine (15 ml) and toluene (20 ml) is heated at 130° C. for three hours under nitrogen. The mixture is partitioned between toluene and water. The toluene phase is washed with water, dried over anhydrous magnesium sulfate and evaporated to a crude solid. Trituration of the solid with hexane yields a white powder (3.0 gram, 48% yield) melting at 91°–110° C. NMR spectral analysis indicates that this powder contains about 20% of unhydrolyzed acetoxy starting material.

The above-named title compound can be isolated in pure form from the white powder by recrystallization or by chromatographic separation methods.

What is claimed is:

1. A compound of formula D, G, I-K or M

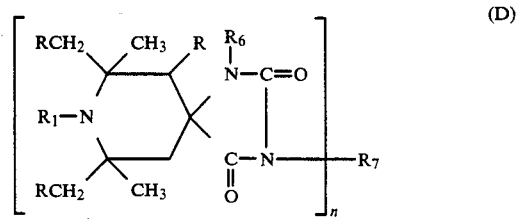

(D)

(G)

$$T_4\left[-N\underset{Y}{\overset{M}{\diagup}}\diagdown N-OH\right]_n$$ with $T_5, T_6$ substituents (I)

$$N\left(CH_2COO\text{—}\underset{T_5\ T_6}{\overset{T_5\ T_6}{\diagup}}N-OH\right)_3$$

(J)

$$\left[-N\text{—}T_{10}\text{—}N\text{—}T_{11}-\right]_k$$ with piperidine rings bearing $T_5, T_6$ and N—OH (K)

$$HO-N \cdots \text{(triazine-linked bis-piperidine with } R_3, T_{12})\cdots T_{12}\text{, or}$$ subscript $e$ (M)

piperidine with HO—N, $T_5, T_6$, linked to $O$—C($E_4$)($E_3$)($E_1$—$E_2$)

wherein
R is hydrogen or methyl
n is 1 or 2,
$R_1$ is hydroxyl,
$R_6$ is hydrogen, $C_1$-$C_{12}$ alkyl, allyl, benzyl, glycidyl or $C_2$-$C_6$ alkoxyalkyl;
when n is 1
$R_7$ is hydrogen, $C_1$-$C_{12}$ alkyl, $C_3$-$C_5$ alkenyl, $C_7$-$C_9$ aralkyl, $C_5$-$C_7$ cycloalkyl, $C_2$-$C_4$ hydroxyalkyl, $C_2$-$C_6$ alkoxyalkyl, $C_6$-$C_{10}$ aryl, glycidyl, a group of the formula —$(CH_2)_m$—COO—Q or of the formula —$(CH_2)_m$—O—CO—Q wherein m is 1 or 2, and Q is $C_1$-$C_4$ alkyl or phenyl; or
when n is 2,
$R_7$ is $C_2$-$C_{12}$ alkylene, $C_6$-$C_{12}$ arylene, a group —$CH_2CH(OH)$—$CH_2$—O—X—O—$CH_2$—CH(OH)—$CH_2$— wherein X is $C_2$-$C_{10}$ alkylene, $C_6$-$C_{15}$ arylene or $C_6$-$C_{12}$ cycloalkylene, or a group —$CH_2CH(OZ^1)CH_2$—$(OCH_2)CH_2)_2$— wherein $Z^1$ is hydrogen, $C_1$-$C_{18}$ alkyl, allyl, benzyl, $C_2$-$C_{12}$ alkanoyl or benzoyl;
when n is 1,
$T_4$ is hydrogen, $C_1$-$C_{18}$ alkyl, $C_5$-$C_7$ cycloalkyl, $C_2$-$C_8$ alkenyl unsubstituted or substituted by a cyano, carbonyl or carbamide group, or it is glycidyl, a group of the formula —$CH_2CH(OH)$—Z or of the formula —CONH—Z and Z is hydrogen, methyl or phenyl; or
when n is 2,
$T_4$ is $C_2$-$C_{12}$ alkylene, $C_6$-$C_{12}$ arylene, xylylene, a —$CH_2CH(OH)$—$CH_2$ group, or a group —$CH_2$—CH(OH)—$CH_2$—O—X—O—$CH_2$—CH(OH)—$CH_2$— wherein X is $C_2$-$C_{10}$ alkylene, $C_6$-$C_{15}$ arylene or $C_6$-$C_{12}$ cycloalkylene; or, provided that $R_3$ is not alkanoyl, alkenoyl or benzoyl, $R_4$ can also be divalent acyl radical of an aliphatic, cycloaliphatic or aromatic dicarboxylic acid or dicarbamic acid, or can be the group —CO—; or $R_3$ and $R_4$ together when p is 1 can be the cyclic acyl radical of an aliphatic or aromatic 1,2- or 1,3-dicarboxylic acid;
$T_5$ is methyl,
$T_6$ is methyl or ethyl, or $T_5$ and $T_6$ together are tetramethylene or pentamethylene;
M and Y are independently methylene or carbonyl, but are not both carbonyl;
$T_{10}$ and $T_{11}$ are independently alkylene of 2 to 12 carbon atoms, or $T_{11}$ is triazine ring with $T_8, T_9$ substituents on N $T_8$ and $T_9$ are independently hydrogen, alkyl of 1 to 18 carbon atoms, or $T_8$ and $T_9$ together are alkylene of 4 to 6 carbon atoms, or 3-oxapentamethylene,
k is 2 to 100,
$T_{12}$ is $$-NH(CH_2)_a-\overset{|}{N}(CH_2)_b-\overset{|}{N}[(CH_2)_c-N]_dH$$

where a, b and c are independently 2 or 3, and d is 0 or 1; and e is 3 or 4;
$E_1$ and $E_2$, being different, each are oxo or imino,
$E_3$ is hydrogen, alkyl of 1 to 30 carbon atoms, phenyl, naphthyl, said phenyl or said naphthyl substituted by chloride or by alkyl of 1 to 4 carbon atoms, or phenylalkyl of 7 to 12 carbon atoms, or said phenylalkyl substituted by alkyl of 1 to 4 carbon atoms, and
$E_4$ is hydrogen, alkyl of 1 to 30 carbon atoms, phenyl, naphthyl or phenylalkyl of 7 to 12 carbon atoms, or
$E_3$ and $E_4$ together are polymethylene of 4 to 17 carbon atoms, or said polymethylene substituted by up to four alkyl groups of 1 to 4 carbon atoms.

2. The compound of formula D according to claim 1 wherein $R_1$ is hydroxyl, R is hydrogen, $R_6$ is hydrogen, $R_7$ is dodecyl and n is 1.

3. The compound of formula G according to claim 1 wherein n is 2, $T_4$ is ethylene, M is methylene, Y is carbonyl and $T_5$ and $T_6$ are each methyl.

4. The compound of formula I according to claim 1 wherein $T_5$ and $T_6$ are each methyl.

5. A compound of formula J according to claim 1 wherein k is 2 to 100, $T_5$ and $T_6$ are each methyl, $T_{10}$ is hexamethylene and $T_{11}$ is

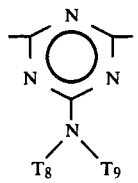

where $T_8$ is hydrogen and $T_9$ is tert-octyl.

6. A compound of formula J according to claim 1 wherein k is 2 to 100, $T_5$ and $T_6$ are each methyl, $T_{10}$ is hexamethylene and $T_{11}$ is

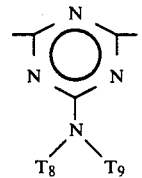

where $T_8$ and $T_9$ together are 3-oxapentamethylene.

7. The compound of formula K according to claim 1 wherein $T_5$ and $T_6$ are each methyl, $R_3$ is n-butyl, e is 4 and $T_{12}$ is

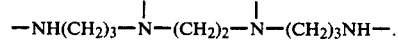

8. The compound of formula M according to claim 1 wherein $T_5$ and $T_6$ are each methyl, $E_1$ is oxo, $E_2$ is imino and $E_3$ and $E_4$ together are undecamethylene.

9. The compound which is bis-(1-hydroxy-2,2,6,6-tetramethylpiperidin-4-yl)butyl-(3,5-di-tert-butyl-4-hydroxybenzyl)malonate.

* * * * *